Patented Aug. 29, 1950

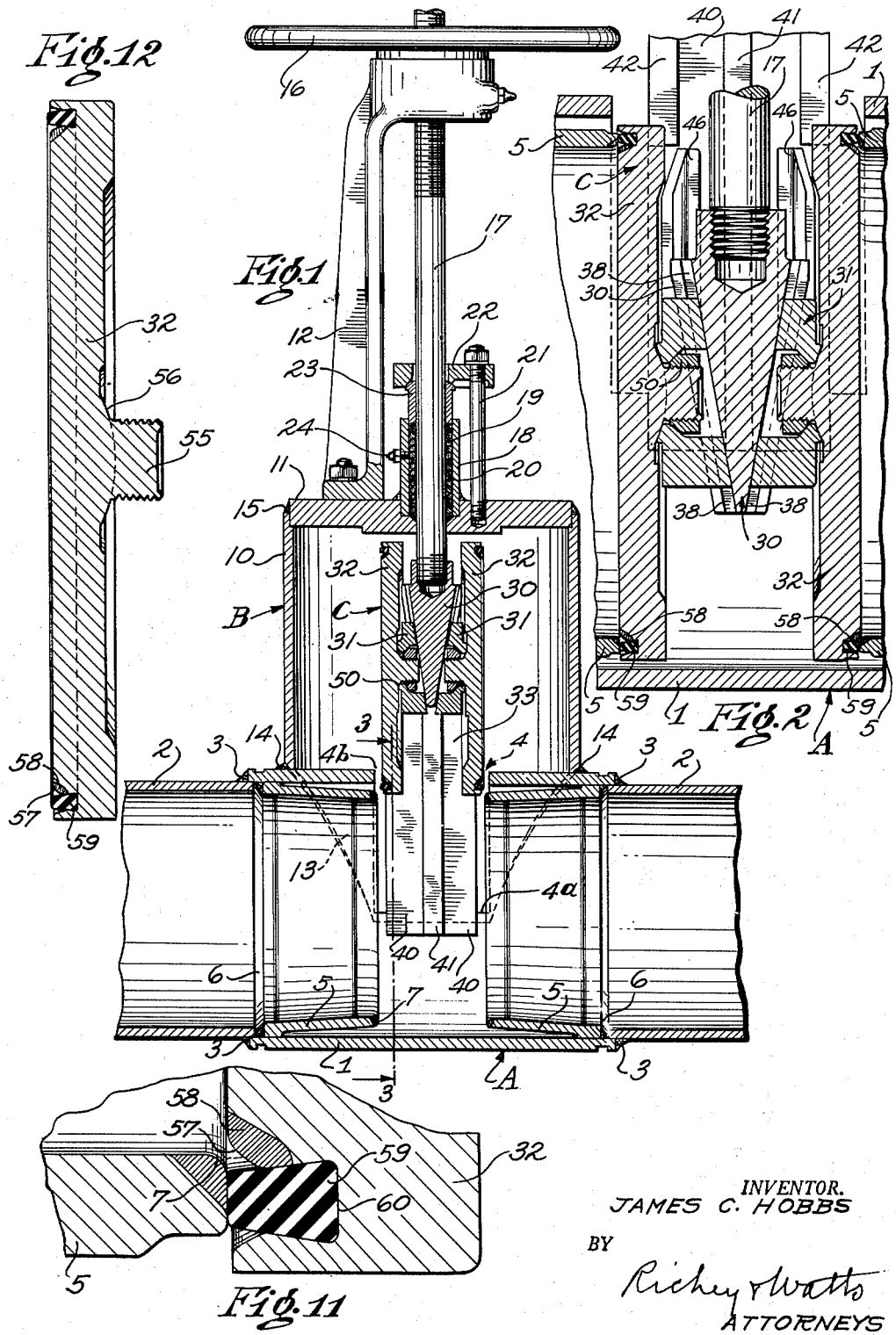

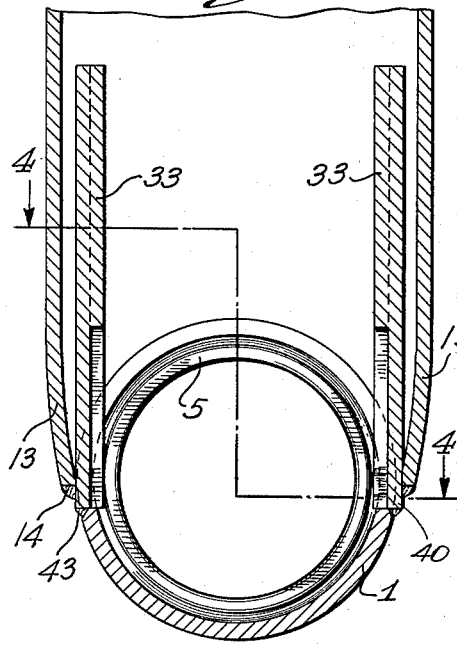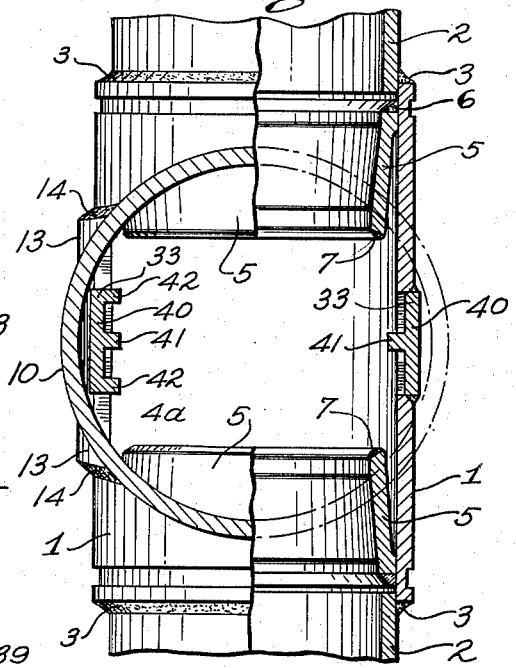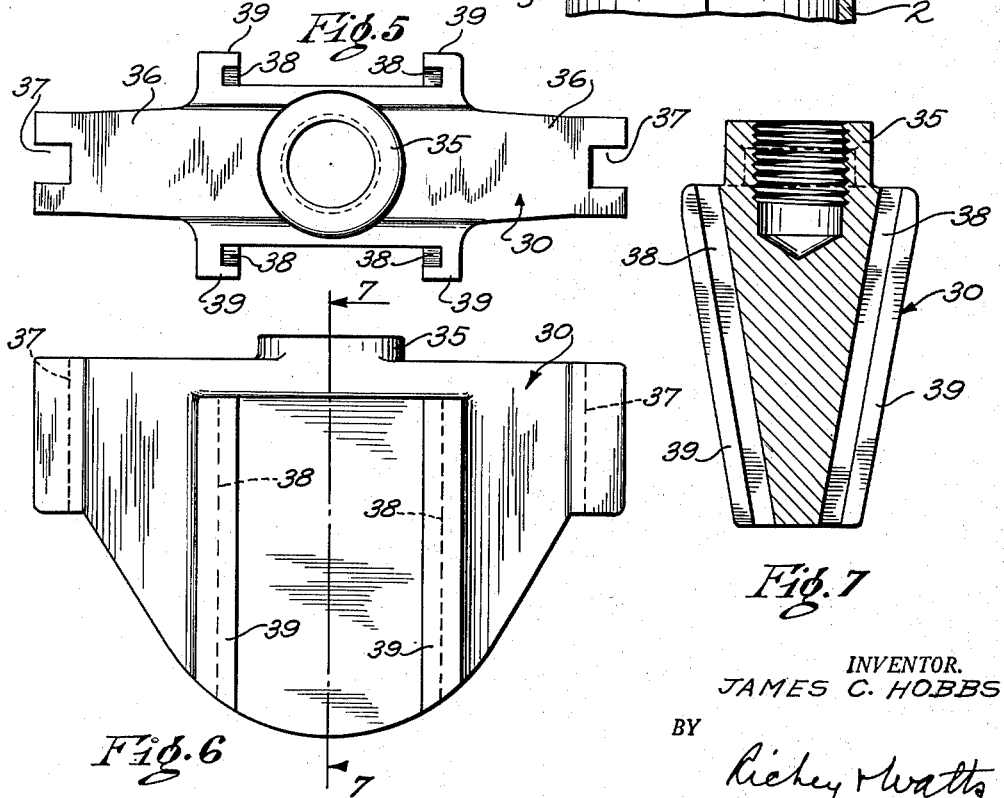

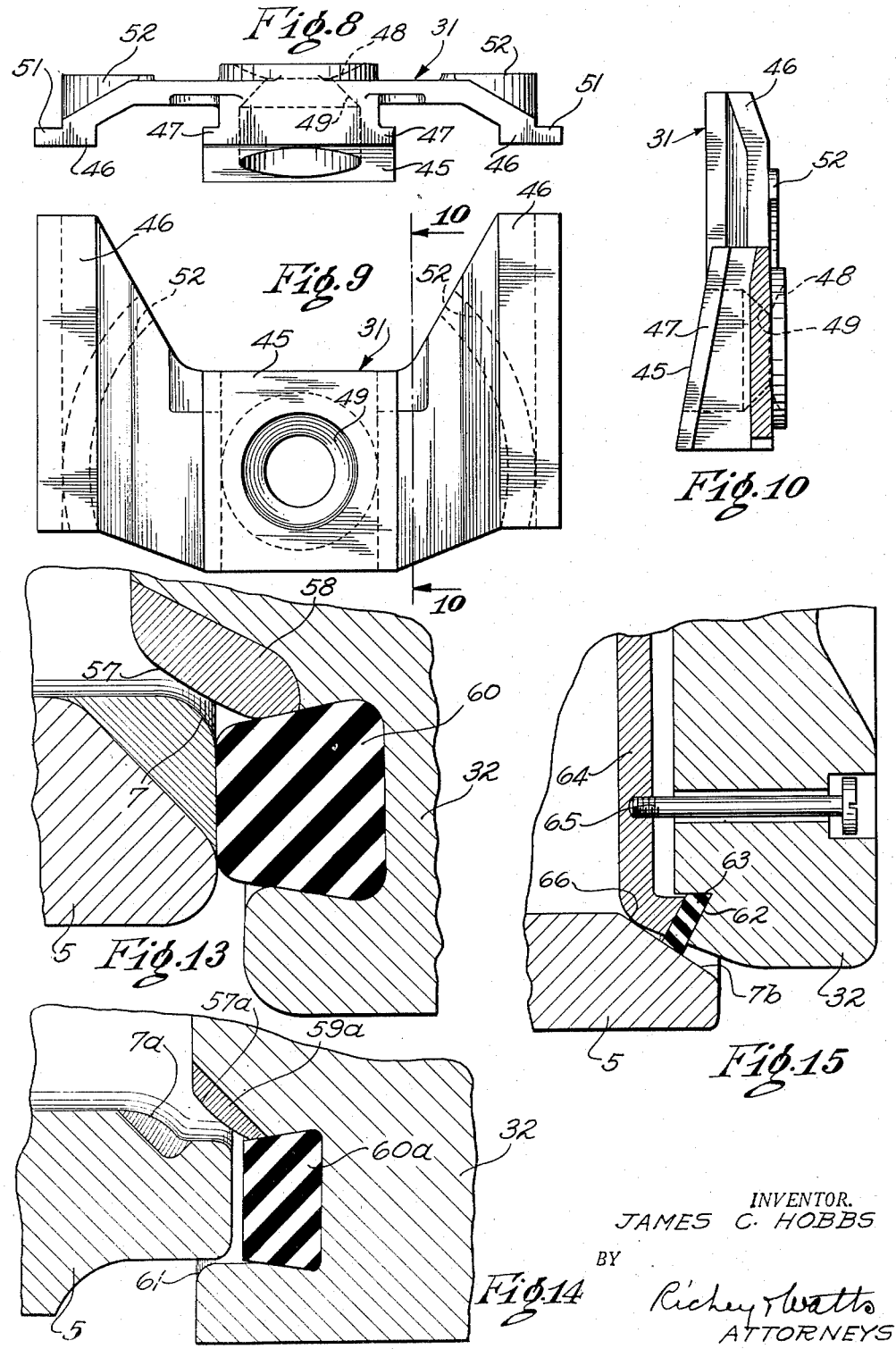

2,520,364

UNITED STATES PATENT OFFICE 2,520,364

GATE VALVE

James C. Hobbs, Painesville, Ohio

Application February 15, 1945, Serial No. 578,086

8 Claims. (Cl. 251—68)

The present invention relates to the valve art, and particularly to a new gate valve.

The present invention makes it possible commercially to construct gate valves which are substantially proof against leakage even when pipe line distortion takes place and which, as compared with prior conventional gate valves, are lighter in weight, smaller in size, lower in cost, greater in strength, and require the expenditure of much less force for opening and closing.

A gate valve embodying the present invention comprises a new combination of parts, certain of which are new per se, and has a new mode of operation and produces new and valuable results.

The present invention will be better understood by those skilled in the art from the following description of drawings which form a part of this specification and in which, Figure 1 is a longitudinal, central, sectional view thru a gate valve embodying the present invention;

Figure 2 is an enlarged, fragmentary, detail view showing the valve parts of Fig. 1 in closed position;

Figure 3 is a transverse, sectional view taken on line 3—3 of Fig. 1;

Figure 4 is a sectional view taken on line 4—4 of Fig. 3;

Figures 5 and 6 are, respectively, a top plan and side elevational view of the wedge of Figs. 1 and 2;

Figure 7 is a sectional view taken on line 7—7 of Fig. 6;

Figures 8 and 9 are, respectively, top plan and side elevational views of one of the spreaders of Fig. 1;

Figure 10 is a sectional view taken on line 10—10 of Fig. 9;

Figure 11 is an enlarged fragmentary sectional view showing the sealing surfaces of the valve of Fig. 1 when they are in engagement;

Figure 12 in an enlarged, central, sectional view of one of the disks of Fig. 1;

Figure 13 is a view similar to Fig. 11 but showing a modified form of sealing surfaces;

Figure 14 is a view similar to Figs. 11 and 12 but showing a further modified form of sealing surfaces; and, Figure 15 is a view similar to Figs. 11, 13 and 14 but showing a modified form of disk and sealing means and surfaces.

The gate valve embodying the present invention and shown in Fig. 1, comprises a valve body A, neck B and wedge unit C. Valve body A comprises a tube 1 which is connected at its ends to pipes 2 as by weld metal 3. This tube 1 has a transverse opening 4 which is a little more than 180° in circumferential length and a little wider, as measured axially of tube 1, than the over-all width of wedge unit 3. This opening is defined by longitudinal surfaces 4a and transverse surfaces 4b. Tubular seat bodies 5 are positioned within tube 1 with their remote ends joined to tube 1, as by weld metal 6, and with their adjacent ends preferably projecting slightly into opening 4 and provided with rounded seat surfaces 7. It will be noted that seat bodies 5 are slightly conical with their smaller ends opposed to each other and spaced radially from the surrounding portions of valve body 1. Thus the bodies 5 are out of contact with valve body 1 for most of their lengths and relative movement of the valve body and the seat bodies may take place without engagement with each other particularly at the region of the free ends of the seat bodies.

Valve body 1 may be made from steel tubing or from a flat steel plate by bending it into tubular form and then welding it. Such a valve body is inexpensive to make, is lighter in weight and stronger than a casting, and whatever machining is required is small in amount and may be carried out with ordinary machining tools and equipment. The seat bodies 5 may be similarly constructed and possess similar characteristics. The seat bodies 5 may be provided with seating surfaces 7 by simple machining operations and these surfaces may be hardened if desired prior to assembly of the seat bodies with valve body 1. The seat bodies may be accurately positioned within the valve body and welded in predetermined position, thereby insuring accurate location of the seating surface 7 relative to the body 1 and other parts of the valve.

Neck unit B comprises a tube 10, an end cover 11, a bonnet 12, and wedge actuating stem 17. The tube 10 is disposed with its axis at substantially right angles to valve body 1 and is positioned to enclose opening 4. Tube 10 is cut away at one end to form tapered projections 13 which extend around body 1 to beyond the ends of opening 4, and the edges of projections 13 and the intervening end surfaces of tube 10 are connected to body 1, as by weld metal 14. Thus body 1 and tube 10 define chambers communicating thru opening 4.

At its outer end tube 10 is connected to cover 11, as by weld metal 15. Cover 11 carries a bonnet 12 which includes a hand wheel 16 equipped with threads to engage threads on stem 17 and to move the latter endwise. Cover 11 also carries tube 18 which surrounds stem 17 and acts as a stuffing box. A plurality of resilient rings 19 encircle stem 17 in tube 18 and a plurality of solid, elastic, oversize rings 20 surround stem 17 in tube 18 between rings 19. A plurality of posts 21 attached to cover 11 carry a pressure plate 22 by which pressure may be exerted on sleeve 23 against the adjacent end of the packing in tube 18, the opposite end of the packing being supported against endwise pressure by engagement with cover 11 around stem 17.

Tube 10 may be made of steel tubing or from a bent and welded steel plate, as desired and as described above with respect to body 1, and possesses the desirable features of lightness, strength and low cost which are possessed by body 1. The packing in tube 10, composed as it is of elastic springs and elastic rings is particularly effective in preventing leakage of fluid under pressure along stem 17 and affords little frictional resistance to endwise movement of stem 17 particularly when supplied with lubricant, as may be done thru nipple 24.

The wedge unit C, as illustrated in the drawings, comprises a wedge 30, spreaders 31, closures or disks 32 and guides 33.

The wedge 30 is better shown in Figs. 5, 6 and 7. It comprises a wedge-shaped body which has an internally threaded boss 35 at the wide end for threaded engagement with the end of stem 17 within body neck B, grooves 37 in its edges slidingly to engage the central ribs on guides 33, and side grooves 38 which converge toward the free end thereof and are defined by flanges 39. These grooves 38 slidably receive corresponding flanges on spreaders 31.

Spreaders 31 are better shown in Figs. 8 to 10. Each spreader consists of a central portion 45 and wings 46. The central portion 45 has outwardly projecting and inclined flanges 47 to slide in grooves 38 of wedge 30 and a central opening to receive stud 55 projecting from the rear side of disk 32. The end of this opening, opposed to disk 32, is defined by a surface 48 which is preferably a segment of a spherical surface defined about a center located on the center line of said opening. The other end of the opening has a conical surface 49 to engage the conical surface of a nut 50 threaded onto the stud 55 of disk 32. The wings 46 have flanges 51 which are engageable with the outer ribs of guides 33. The lower ends of flanges 51 engage surfaces 4a of the valve body near one end of the stroke of the wedge and slide on those surfaces when the disks are being seated on the seat bodies. When the lower ends of flanges 51 are in engagement with surfaces 4a the upper ends just clear the lower ends of the outer ribs of guides 33. The outer surface of each spreader 31 has a circular projecting rib 52 to engage with the opposed rear surface of disks 32 and limit the movement of the disks relative to the spreaders.

Disks 32 have, as aforesaid, threaded studs 55 projecting from their rear or outer surface, and each has a spherical surface 56 around its stud 55. This surface is described from a point on the center line of stud 55 by a radius which is substantially the same as that of spherical surface 48 of the cooperating spreader 31. On its front face each disk 32 is provided with a sealing surface 57 which is a segment of a sphere described about a point on the center line of stud 55. The seating surface 57 may be formed on the disk itself and may be hardened if desired but, preferably, it is formed by a weld deposit composed of suitable material, such as aluminum bronze. In many instances, where conditions permit, it is desirable to provide the disks with deformable packing material such as natural or synthetic rubber as an addition to the seating surface 57.

The guides 33 are substantially parallel plates 40 having central ribs 41 and side ribs 42. These guides extend from surfaces 4a of opening 4 in valve body 1, where they are connected to the valve body, as by weld metal 43, nearly to cover 11 of tube 10. At their side edges they bear against and are supported by tube 10, as is better shown in Fig. 4. The middle ribs 41 engage in grooves 37 of wedge 30. The side ribs 42 extend from the end of the guides adjacent to closure 11 to points approximately in line with the adjacent inner surface of valve body 1. The end flanges 51 on spreaders 31 slidingly engage the inner surfaces of these ribs 42 during part of the movement of the wedge and are out of engagement with those ribs when they are in engagement with surfaces 4a, there being a small clearance between those flanges and ribs to permit the spreaders to slide on surfaces 4a and bring flanges 51 underneath ribs 42.

The guides 33 may be fabricated, accurately machined and hardened, if desired, as separate pieces and then held in proper assembled position with respect to the valve body 1 while being permanently secured in place by weld metal 43. This welding operation may be carried out readily and easily due to the fact that it is performed on the outside of body 1.

It will be noted from the foregoing description that the wedge unit C may be readily, accurately, and inexpensively made and assembled. The guides 33 may be milled out of metal bars and assembled in predetermined position with body 1 and attached thereto as by welding. The wedge 3 may be machined with conventional equipment, as is also true of the spreaders 31, disks 32 and nuts 50. These several parts may be assembled and the assembly attached to stem 17, after which cover 11 may be fitted to stem 17 and connected to tube 10.

In Figs. 1, 2 and 11 the disk 32 carries a ring 59 in groove 60 just outside of weld deposit insert 58 which has seating surface 57. This ring may consist of any natural or synthetic rubber or rubber-like material which will deform somewhat under pressure and withstand the temperatures to which it will be subjected in use. As is better shown in Figs. 2 and 11, the ring 59 engages the end of seat body 5 before surface 57 of the disk engages surface 7. The ring 59 may be deformed when the disk is forced toward seat body 5 and will thus insure leak-proof sealing between the seat body and disk. If and when the ring 59 becomes worn or is deformed to a greater extent, the surfaces 57 and 7 will come into contact and prevent leakage of fluid under pressure thru the valve. Thus two seals are provided which may act in series.

Fig. 13 shows a modification of the structure of Fig. 11. In this figure the disk 32 has substantially the same weld deposit 58 with a seating surface 57 thereon, and the seat body 5 has a sealing surface 7 thereon. The packing ring 60, corresponding to ring 59 of Fig. 11 is of less axial length than ring 59 and the face of disk 32 has been cut away near its periphery to permit the portion carrying insert 58 to project into the end of seat body 5. If and when ring 60 wears away or is deformed sufficiently to permit, surfaces 57 and 7 will come into fluid sealing contact and thus two seals acting in series will be provided.

Fig. 14 shows a further modification of the structure of Fig. 11. In this instance the inner surface of seat body 5 is cut away at its end and is provided with a curved sealing surface 7a on its inner surface. The open end of seat body 5 projects into a groove in disk 32 defined by weld deposit 59a having a spherical seating surface 57a thereon and lip 61, and may engage against ring 60a which is of less axial length than this groove. If the ring 60a wears away or is sufficiently compressed, two seals may exist. If ring 60a is omitted, surfaces 57a and 7a may come into fluid sealing contact with each other.

It will be understood that the rings 59 and 60 of Figs. 2, 11 and 13 and 60a of Fig. 14 may be omitted altogether if desirable, particularly where operating conditions, such as temperature, the nature of the fluid being handled and the like, would be detrimental to the material constituting these rings, and fluid sealing contact may be made between the cooperating spherical surfaces of the seat bodies and the disks.

Fig. 15 shows a further modification of the seat body and closure structure. The seat body 5 has a conical surface 7b. The closure disk 32 has an annular inclined recess 62 in which is disposed a packing ring 63 to engage surface 7b. A loose base plate 64 is carried by screws 65 extending thru the disk, the periphery of plate 64 having a spherical surface 66 to engage the conical surface 7b of the seat body. When the disk is moved axially toward the seat body, ring 62 engages surface 7b and further movement brings surface 66 of plate 64 into contact with surface 7b and exerts pressure on ring 62. Thus fluid sealing engagement by plate 64 and ring 63 with seat body 5 is accomplished.

It will be clear from an examination of Figs. 1, 11, 13, 14 and 15 that since the surfaces 57, 57a and 66 are spherical and make contact on the curved inner surfaces 7, 7a and 7b, the plane of contact of these surfaces is at an angle to a line perpendicular to the actual seating surfaces of the seat bodies. In other words, a seat body and its closure or disk have a common axis and that axis is not parallel to a line perpendicular to the sealing surfaces at their point of engagement. One result of this arrangement is that pressure exerted on the disk parallel to its axis is resolved into pressures exerted at an angle thereto against the seat bodies and, as a result, the latter are deflected until a continuous line contact is established and this contact may be broadened under application of greater pressure. A perfect seal is thus formed.

The mode of operation of the apparatus described hereinabove and illustrated in the accompanying drawings is substantially as follows, starting at the position shown in Fig. 1: Rotation of hand wheel 16 moves stem 17 endwise toward valve body 1 and carries wedge unit C with it. Rotation of that unit and stem 17 is prevented by engagement of the wedge 30 and spreaders 31 with the ribs 41 and 42 of guides 33. Forward movement of the wedge unit C is guided by guides 33 and results in movement of the unit thru opening 4 into body 1 until the axes of disk studs 55 substantially coincide with the axis of body 1 and body seats 5. At that point spreader flanges 51 come into contact with surfaces 4a of the valve body and clear the ends of ribs 42, whereupon forward movement of the spreaders and the disks is arrested. Continued movement of wedge 30 moves the spreaders apart along surfaces 4a until the seating surfaces of the disks engage the opposed sealing surfaces of the seat bodies 5. In other words, the wedge advances the disks toward the seat bodies. The cooperating sealing surfaces on seat bodies 5 and disks 32 and the cooperating spherical surfaces 48 of the spreaders and 56 of the disks permits shifting of the disks to positions against the bodies. This shifting may consist of slight pivoting of the disks on the spreaders. A seal is first made between each body 5 and the elastic rings, if the latter are present. Further movement makes a complete circumferential line sealing contact between the spherical surfaces of disks and the surfaces 7 of the seat bodies. Further movement of stem 17 increases the pressure of the valve disks against seat bodies 5 and increases the line contact to an area of contact due to the deformation of the engaging metal surfaces. The upper ends of spreader flanges 51 never pass entirely beyond the ends of ribs 42.

In opening the valve the initial axial movement of stem 17 moves wedge 30 relative to spreaders 31 and, due to the engagement of flanges 51 of the spreaders with the ends of ribs 42 and the convergence of grooves 38, the spreaders and disks are moved toward one another or are retracted along the axis of the seat bodies. When the disks are clear of the seat bodies 5, and the spreaders are clear of ribs 42, continued retracting movement of stem 17 moves the disks and spreaders together with the wedge 30 out of body 1 thru opening 4.

It will be understood from the foregoing description that the disks are moved along a right angle path when the valve is being opened or closed, that is, along the axis of valve body 1 and also at right angles to that axis. In this manner the disks are never slid across the faces of the seat bodies but are advanced and retracted along the axes of those bodies, and when clear of those faces are moved at an angle to those axes. Thus, scratching of the sealing surfaces of the seat bodies and resultant leakage and premature poor sealing which is characteristic of prior conventional gate valves is avoided.

Valves embodying the present invention are easy to open and close and are not distorted by opening and closing movements; they are exceptionally free from distortion due to forces transmitted thereto by attached piping; and they are flexible in the sense that distortion of the piping and valve body have little or no effect on the making and maintaining of a substantially fluid-tight seal.

Forces which are transmitted to the valve body 1 by piping attached thereto and which may distort or tend to distort the valve body are substantially without effect on the seat bodies 5 due to the fact that each seat body is attached at one end to the valve body, is out of contact thruout substantially its full length with the valve body, and the valve body and seat bodies can move relatively toward and away from each other for substantially the full length of the seat bodies and particularly in the region of the seating surface ends of the seat bodies. Any forces from the piping which are sufficient to distort or deflect the valve body will have substantially no effect on the seating surfaces of the seat bodies, either as regards deformation of those surfaces or displacement of them relative to the longitudinal center lines of the seat bodies. Furthermore, any weakening effect of the opening 4 on valve body 1 is more than offset by the strengthening effect of neck B.

The opening and closing of the valve is easily accomplished because frictional forces are maintained at a minimum value. Since the valve disks are moved along substantially angular paths into and out of valve opening and closing positions, the major amount of friction to be overcome is between the wedge and spreaders and between the spreaders and surfaces 4a of the valve body and end surfaces of ribs 42, and the pressure exerted on the cooperating surfaces of these parts is at all times quite low as compared with that present in prior wedge-type valves. Since this friction is small in amount and the valve disks are moved axially of the seat bodies when sealing contact is being made or broken, the forces required to seat the disks are low and thus actuation of the operating mechanism is comparatively easy and the actuating mechanism has little or no tendency to distort the valve body. The rounded or conical seating surfaces on the seat bodies and the spherical cooperating surfaces on the closures or disks, together with the limited freedom of movement of the valve disks relative to the spreaders, results in the disks adjusting themselves to the seat bodies and making a fluid-tight contact without any scraping movement of the disks under pressure on the seating surfaces of the seat bodies. Thus, scratching of the sealing surfaces is avoided over long periods of use with resultant avoidance of leakage. The fact that the seat bodies are elongated tubes and have thin walls permits the seating surface ends of those bodies to distort or deflect slightly to accommodate themselves to the sealing surfaces of the disks and to maintain sealing contact with the disks even in case the seat bodies are deflected by forces transmitted thereto thru the valve body from the piping.

Having thus described my invention so that others skilled in the art may be able to understand and practice the same, I state that what I desire to secure by Letters Patent is defined in what is claimed.

What is claimed is:

1. A gate valve comprising a valve body having opposed seating surfaces, discs maintained out of contact with said body and having surfaces to engage said seating surfaces and close the valve, spreaders carrying said discs and having spherical surface engagement with central parts thereof and having opposite end surfaces, a wedge slidably engaging and carrying said spreaders, means in the body engaging and guiding said wedge and spreaders during their movement transversely of said body, pairs of guides in the body, each pair engaging the end surfaces of said spreaders when the discs are in approximate alignment with said seating surfaces for guiding said spreaders during their movement longitudinally of the body as the discs are moved into and out of engagement with said seating surfaces, and means for moving the wedge-spreader-disc assembly to open or close the valve.

2. A gate valve comprising a cylindrical member enclosing seat tubes, seating surfaces on opposed ends of said tubes, and a gate-assembly-enclosing tube extending transversely from said member, discs maintained out of contact with said member and having surfaces to engage said seating surfaces and close the valve, spreaders carrying said discs and having surface engagement with central parts thereof and having opposite end surfaces, a wedge slidably engaging and carrying said spreaders, means in the cylindrical member engaging and guiding said wedge and spreaders during their movement transversely of said cylindrical member, said means including a pair of machined guides on opposite edges of said wedge and spreaders within said transverse tube and connected to said cylindrical member, pairs of guides in the member, each pair engaging opposite end surfaces of said spreaders when the discs are in approximate alignment with said seating surfaces for guiding said spreaders during their movement longitudinally of the member as the discs are moved into and out of engagement with said seating surfaces, and means for moving the wedge-spreader-disc assembly to open or close the valve.

3. A gate valve comprising a cylindrical member including opposed seating surfaces, discs maintained out of contact with said member and having surfaces to engage said seating surfaces and close the valve, spreaders carrying said discs and having surface engagement with central parts thereof and having opposite end surfaces, a wedge slidably engaging and carrying said spreaders, means in said member engaging and guiding said wedge and spreaders during their movement transversely of said member, said means comprising a pair of machined transverse guides engaging the edges of said wedge and spreaders and secured at their inner ends to the cylindrical member near the intersection therewith of a longitudinal plane through the center of the member, a tube positioned at right angles to said member outside of said guides and secured to the outer surfaces of said guides adjacent to their attachments to said member, pairs of longitudinal guides in the member, each pair engaging opposite end surfaces of said spreaders when the discs are in approximate alignment with said seating surfaces for guiding said spreaders during their movement longitudinally of the body as the discs are moved into and out of engagement with said seating surfaces, and means for moving the wedge-spreader-disc assembly to open or close the valve.

4. A gate valve comprising a valve body having opposed seating surfaces, discs maintained out of contact with said body, having surfaces to engage said seating surfaces and close the valve, and having projecting central portions, spreaders attached to said central portions for limited relative movement of the spreaders and discs and having opposite end surfaces, a wedge slidably engaging and interlocking with said spreaders for relative movement in only one plane, means in the body engaging and guiding said wedge and spreaders during their movement transversely of said body, pairs of guides in the body, each pair engaging opposite end surfaces of said spreaders for guiding said spreaders when the discs are in approximate alignment with said seating surfaces during their movement longitudinally of the body as the discs are moved into and out of engagement with said seating surfaces, and means for moving the wedge-spreader-disc assembly to open or close the valve.

5. A gate valve comprising a valve body having opposed seating surfaces, discs maintained out of contact with said body, having surfaces to engage said seating surfaces and close the valve, and having central projecting portions, spreaders carrying said discs and having surface engagement with said central portions and having opposite end surfaces, said spreaders having opposite side transverse flanges and parallel longitudinal end surfaces, a wedge carrying said spreaders and having flanges at its opposite edges, opposed guides having ribs engaging the flanges of said spreaders and wedge for guiding the spreaders and wedge during their movement transversely of the body, pairs of guides in the body engaging the end surfaces of said spreaders when the discs are in approximate alignment with said seating surfaces for guiding said spreaders during their movement longitudinally of the body as the discs are moved into and out of engagement with said seating surfaces, and means for moving the wedge-spreader-disc assembly to open or close the valve.

6. A gate valve comprising a valve body having opposed seating surfaces, discs having axial portions and having annular surfaces to engage said seating surfaces and close the valve, spreaders attached to said axial portions and maintaining said discs out of contact with body while permitting limited movement about the axes of said portions and having opposite end surfaces, a wedge slidably engaging and carrying said spreaders, means in the body for guiding said wedge and spreaders during their movement transversely of said body, and pairs of guides in the body and each pair engaging the end surfaces of said spreaders when the discs are in approximate alignment with said seating surfaces for guiding said spreaders during their movement longitudinally of the body as the discs are moved into and out of engagement with said seating surfaces, and means for moving the wedge-spreader-disc assembly to open or close the valve.

7. A gate valve comprising a body having opposed seating surfaces therein, discs maintained out of contact with said body, spreaders having opposite ends, carrying said discs and having connection with central portions thereof, a wedge slidably connected to said spreaders, guides extending transversely of said body and engaging opposite ends of said spreaders and wedge for directing the travel of said spreaders and wedge transversely of said body, and guides in the body and engaging the opposite ends of the spreaders when the discs carried thereby are in substantial alignment with said surfaces for directing travel of said spreaders longitudinally of the body to move the discs into and out of engagement with said seating surfaces, and means for moving the spreaders along said transverse and longitudinal guides.

8. A gate valve comprising a fabricated tube body having a transverse, valve receiving opening extending throughout substantially 180° thereof, two fabricated tubes disposed within said body, welded thereto at their remote ends and having their adjacent ends formed with valve seating surfaces disposed in approximate transverse alignment with the sides of said opening, said tubes being out of contact with said body for the major part of their lengths from their seating surface ends toward their welded ends, premachined guides seated at their inner ends on the opposite ends of said opening and attached by weld metal to the adjacent outer surface of said body, a fabricated tubular neck disposed at substantially right angles to said body, having an annular end surface seating thruout substantially its full length on the outer surface of said body and enclosing said guides and opening, and weld metal connecting said end surface thruout its entire circumferential length to the outer surfaces of said guides and body.

JAMES C. HOBBS.

REFERENCES CITED

The following references are of record in the file of this patent:

UNITED STATES PATENTS

| Number | Name | Date |
|---|---|---|
| 270,009 | Burns | Jan. 2, 1883 |
| 680,714 | Jefferson | Aug. 20, 1901 |
| 712,682 | Jefferson | Nov. 4, 1902 |
| 791,173 | Anglim | May 30, 1905 |
| 904,056 | Farrell | Nov. 17, 1908 |
| 2,034,418 | Plant | Mar. 17, 1936 |
| 2,100,996 | Moore | Nov. 30, 1937 |
| 2,114,789 | Urquhart | Apr. 19, 1938 |
| 2,401,377 | Smith | June 4, 1946 |

FOREIGN PATENTS

| Number | Country | Date |
|---|---|---|
| 678 | Great Britain | Feb. 24, 1875 |
| 10,188 | Great Britain | May 23, 1895 |
| 82,802 | Sweden | Mar. 5, 1935 |
| 529,169 | Germany | July 1, 1931 |
| 735,816 | France | Sept. 6, 1932 |
| 770,610 | France | July 2, 1934 |